(12) United States Patent
Coscarella

(10) Patent No.: US 9,404,606 B2
(45) Date of Patent: Aug. 2, 2016

(54) BACKPLATE FOR A UTILITY BOX

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 106 days.

(21) Appl. No.: 14/272,277

(22) Filed: May 7, 2014

(65) Prior Publication Data

US 2014/0332638 A1    Nov. 13, 2014

Related U.S. Application Data

(60) Provisional application No. 61/820,689, filed on May 7, 2013.

(51) Int. Cl.
| | | |
|---|---|---|
| *H05K 7/14* | (2006.01) | |
| *F16L 3/12* | (2006.01) | |
| *F16L 5/02* | (2006.01) | |

(52) U.S. Cl.
CPC .... *F16L 3/12* (2013.01); *F16L 5/02* (2013.01)

(58) Field of Classification Search
CPC ............. H02G 3/088; F16L 5/02; H02B 1/40; Y10S 248/906
See application file for complete search history.

(56) References Cited

U.S. PATENT DOCUMENTS

| | | | |
|---|---|---|---|
| 1,249,892 A | 12/1917 | Bropson | |
| 2,407,023 A | 9/1946 | Lockwood | |
| 2,985,465 A | 5/1961 | Church | |
| 3,787,061 A | 1/1974 | Yoakum | |
| 3,809,350 A | 5/1974 | Lane | |
| 3,913,928 A | 10/1975 | Yamaguchi | |
| 4,087,624 A * | 5/1978 | Hitchcock | A62C 3/16 169/48 |
| 4,162,347 A | 7/1979 | Montgomery | |
| 4,265,058 A | 5/1981 | Logsdon | |
| 4,293,138 A | 10/1981 | Swantee | |
| 4,296,870 A * | 10/1981 | Balkwill | H02G 3/126 174/57 |
| 4,350,351 A | 9/1982 | Martin | |
| 4,385,777 A | 5/1983 | Logsdon | |
| 4,386,488 A | 6/1983 | Gibbs | |
| 4,482,161 A | 11/1984 | Izzi, Sr. | |
| 4,526,407 A | 7/1985 | Kifer | |
| 4,548,853 A | 10/1985 | Bryan | |
| 4,563,847 A | 1/1986 | Hasty | |
| 4,794,207 A * | 12/1988 | Norberg | H02G 3/125 174/505 |
| 4,903,997 A | 2/1990 | Kifer | |
| 4,905,940 A | 3/1990 | Luka | |

(Continued)

FOREIGN PATENT DOCUMENTS

| | | |
|---|---|---|
| DE | 41 31 637 A1 | 4/1992 |
| DE | 298 00 679 U1 | 7/1998 |

(Continued)

*Primary Examiner* — Bradley Duckworth
(74) *Attorney, Agent, or Firm* — Christensen O'Connor Johnson Kindness PLLC

(57) ABSTRACT

A backplate for installation between a utility box and an exterior surface of a building has a plate body having a first side and a second side. A moisture dam on the plate body extends outward from the first side of the plate body. The moisture dam defines a receptacle that is sized and shaped to receive the utility box such that when the plate body is installed between the utility box and the exterior surface of the building. The moisture dam receives and extends around an outer perimeter of a rear surface of the utility box. Apertures through the plate body receive one or more utility lines and for receiving a mounting system. There are one or more seals on the second side of the plate body for sealing between the apertures and an outer perimeter of the plate body.

19 Claims, 6 Drawing Sheets

(56) References Cited

U.S. PATENT DOCUMENTS

| | | | |
|---|---|---|---|
| 4,927,039 A | 5/1990 | McNab | |
| 4,952,754 A * | 8/1990 | Rye | H02G 3/088 174/53 |
| 5,133,165 A * | 7/1992 | Wimberly | E04F 19/02 52/220.8 |
| 5,237,789 A | 8/1993 | Thaler | |
| 5,248,154 A | 9/1993 | Westhoff | |
| 5,347,776 A | 9/1994 | Skoff | |
| 5,501,472 A | 3/1996 | Brancher | |
| 5,549,266 A * | 8/1996 | Mitchell | F16B 19/004 248/205.1 |
| 5,557,078 A | 9/1996 | Holwerda | |
| 5,860,256 A | 1/1999 | Humber | |
| 5,944,361 A | 8/1999 | Bravo | |
| 6,161,589 A | 12/2000 | Bolotte | |
| 6,185,885 B1 | 2/2001 | Thaler | |
| 6,315,849 B1 | 11/2001 | Ross | |
| 6,395,984 B1 | 5/2002 | Gilleran | |
| 6,417,447 B1 | 7/2002 | Bosse, Jr. | |
| 6,494,463 B1 | 12/2002 | Rank | |
| 6,543,186 B2 | 4/2003 | Gilleran | |
| 6,596,938 B2 | 7/2003 | Gilleran | |
| 6,649,835 B2 | 11/2003 | Gilleran | |
| 6,723,921 B2 * | 4/2004 | Vagedes | H02G 3/123 174/54 |
| 6,860,070 B2 | 3/2005 | Gilleran | |
| 6,862,852 B1 | 3/2005 | Beele | |
| 6,891,104 B2 * | 5/2005 | Dinh | H02G 3/14 174/375 |
| 6,951,081 B2 * | 10/2005 | Bonshor | H02G 3/088 52/302.1 |
| 6,979,777 B2 * | 12/2005 | Marcou | H02G 3/14 174/50 |
| 7,005,578 B2 * | 2/2006 | Gretz | H02G 3/123 174/50 |
| 7,176,377 B1 | 2/2007 | Gretz | |
| 7,192,219 B2 | 3/2007 | Graziosi | |
| 7,319,192 B1 * | 1/2008 | Gretz | H02G 3/123 174/50 |
| 7,410,372 B2 * | 8/2008 | Johnson | H02G 3/14 174/66 |
| 7,435,900 B1 * | 10/2008 | Gretz | H01R 25/006 174/480 |
| 7,568,314 B2 | 8/2009 | Collins | |
| 7,626,118 B1 * | 12/2009 | Capozzi | H02G 3/088 174/50 |
| 7,637,385 B2 * | 12/2009 | Wegner | H02G 3/086 174/57 |
| 7,645,937 B2 * | 1/2010 | Bhosale | H02G 3/123 174/135 |
| 7,674,974 B1 | 3/2010 | Shotey | |
| 7,763,799 B2 * | 7/2010 | Johnson | H02G 3/088 174/481 |
| 7,789,257 B2 | 9/2010 | Davis | |
| 7,802,798 B2 | 9/2010 | Beele | |
| 7,875,798 B2 * | 1/2011 | Funk | H02G 3/088 174/50 |
| 7,880,085 B2 * | 2/2011 | Nurenberg | H02G 3/088 174/66 |
| 7,918,066 B1 | 4/2011 | Bauer | |
| 8,046,955 B2 * | 11/2011 | Chan | H02G 3/088 52/209 |
| 8,079,599 B2 | 12/2011 | Meyers | |
| 8,156,700 B2 | 4/2012 | Umlor | |
| 8,530,757 B2 * | 9/2013 | Dinh | H02G 3/088 174/481 |
| 2001/0052564 A1 | 12/2001 | Karlinger | |
| 2003/0019163 A1 | 1/2003 | Dittel | |
| 2003/0037942 A1 | 2/2003 | Haselby | |
| 2003/0178787 A1 * | 9/2003 | Christie | F16J 15/025 277/549 |
| 2004/0045233 A1 | 3/2004 | Beele | |
| 2005/0017610 A1 * | 1/2005 | Mistry | H02B 1/28 312/245 |
| 2005/0042403 A1 | 2/2005 | Boge | |
| 2005/0055889 A1 | 3/2005 | Thaler | |
| 2006/0027388 A1 | 2/2006 | Collins | |
| 2007/0245894 A1 | 10/2007 | Poulis | |
| 2008/0085336 A1 | 4/2008 | Mayle | |
| 2008/0124506 A1 | 5/2008 | Boge | |
| 2008/0157518 A1 | 7/2008 | Cecilio | |
| 2009/0152820 A1 | 6/2009 | Meyers | |
| 2010/0059941 A1 | 3/2010 | Beele | |
| 2010/0263311 A1 | 10/2010 | Ryden | |
| 2011/0056743 A1 * | 3/2011 | Solan | H02G 3/123 174/502 |
| 2013/0231042 A1 * | 9/2013 | Coscarella | F24F 7/00 454/339 |
| 2013/0234404 A1 * | 9/2013 | Coscarella | F16L 5/10 277/606 |
| 2014/0021688 A1 | 1/2014 | Hattori | |
| 2014/0159359 A1 | 6/2014 | Beall | |
| 2014/0202758 A1 * | 7/2014 | Lolachi | H02G 3/123 174/481 |
| 2014/0232106 A1 | 8/2014 | Mukai | |
| 2014/0260044 A1 | 9/2014 | Gilleran | |
| 2015/0075080 A1 * | 3/2015 | Ellingson | E06B 7/2309 49/483.1 |
| 2015/0076978 A1 * | 3/2015 | Ellingson | H02B 1/28 312/229 |

FOREIGN PATENT DOCUMENTS

| | | |
|---|---|---|
| DE | 20 2012 101 447 U1 | 7/2012 |
| DE | 20 2013 100 908 U1 | 6/2013 |
| EP | 0 161 557 A2 | 11/1985 |
| EP | 2 063 163 B1 | 5/2009 |
| EP | 2 703 703 A1 | 3/2014 |

* cited by examiner

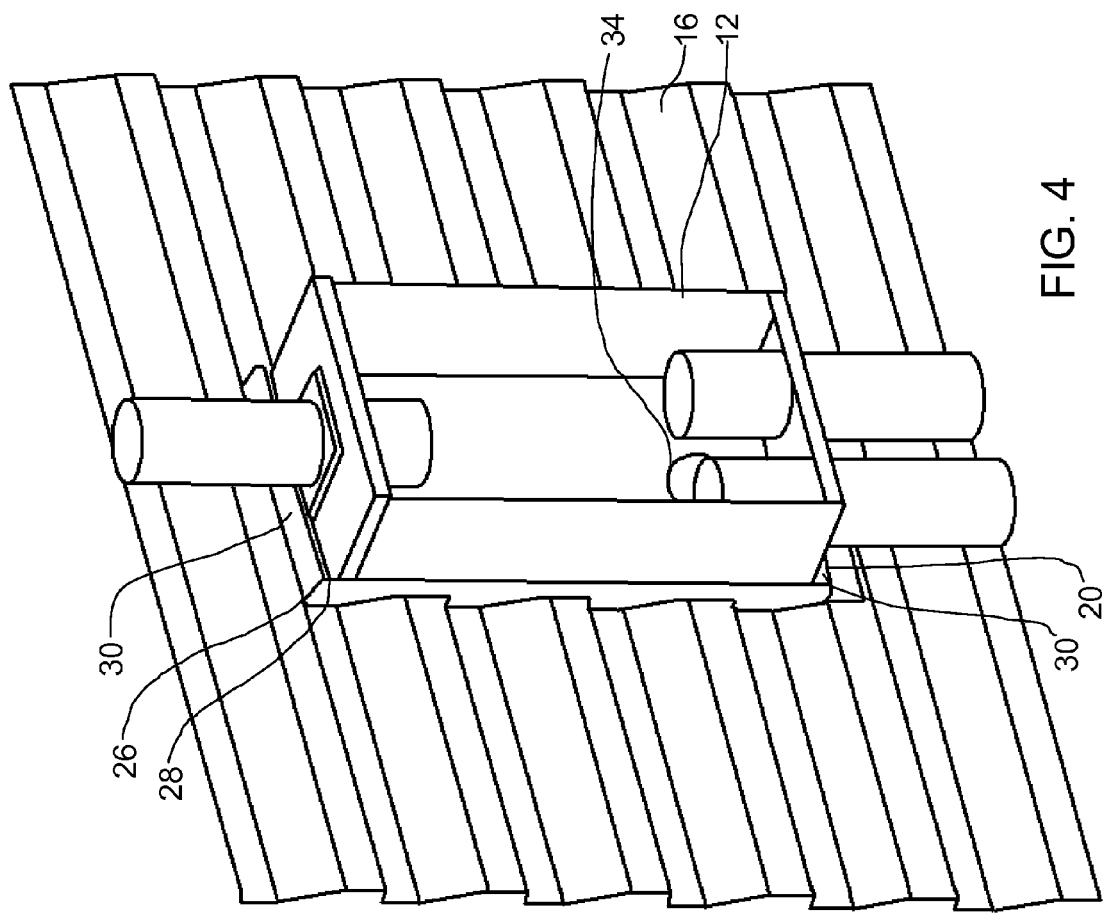
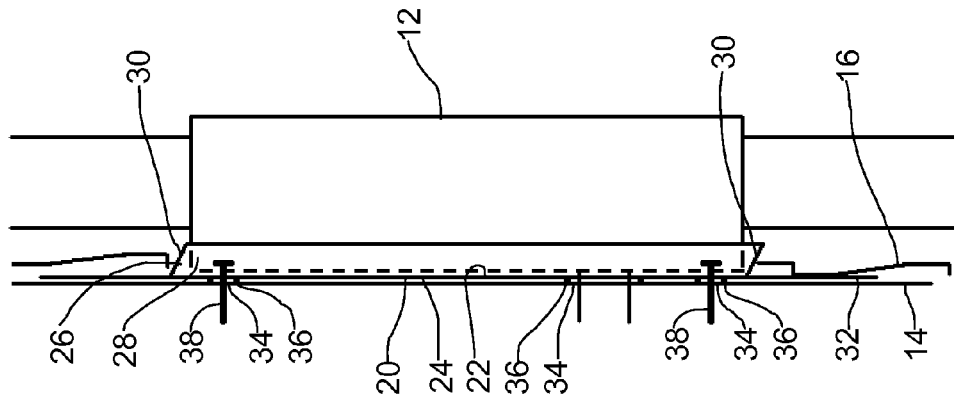

BACKPLATE FOR A UTILITY BOX

TECHNICAL FIELD

This relates to a backplate used to protect behind a utility box on a building against moisture.

BACKGROUND

In order to have utilities enter a building, it is often necessary to make a hole in a wall. The connection between the utility line on the outside and the utility line on the inside of the building is often protected by a utility box, which is attached to the outside of the building.

SUMMARY

A backplate for installation between a utility box and an exterior surface of a building comprises a plate body having a first side and a second side, apertures through the plate body for receiving one or more utility lines and for receiving a mounting system, and a moisture dam on the plate body and extending outward from the first side of the plate body. The moisture dam defines a receptacle that is sized and shaped to receive the utility box such that when the plate body is installed between the utility box and the exterior surface of the building, the plate body has an underlying portion contained within the moisture dam that underlies the utility box and an outer portion extending outward from the moisture dam. The moisture dam receives and extends around an outer perimeter of a rear surface of the utility box. The moisture dam comprises a sloped upper surface for redirecting liquid.

According to an aspect, the sloped upper surface may slope downward away from the plate body.

According to an aspect, the moisture dam may further comprise a sloped bottom edge that slopes downward away from the plate body.

According to an aspect, the moisture dam may define a channel, and the sloped upper surface may slope downward toward an outer edge of the plate body.

According to an aspect, the moisture dam may comprise a sloped surface on a first edge and a second edge that is perpendicular to the first edge.

According to an aspect, the moisture dam may comprise a peripheral flange carried by the plate body and a frame that is removably mounted to the peripheral flange. The frame, the peripheral flange and the plate body may define a U-shaped channel around the outer perimeter of the utility box when the peripheral flange is mounted to the peripheral flange. The underlying portion may be spaced outward relative to the outer portion such that the utility box is spaced from the exterior surface of the building. The U-shaped channel may receive siding installed on the exterior surface of the building.

According to an aspect, there may be a seal that extends around a plurality of the apertures or a plurality of seals that extend around each aperture.

According to an aspect, the moisture dam may extend completely around the outer perimeter of the rear surface of the utility box.

According to an aspect, there may be one or more seals on the second side of the plate body for sealing between the apertures and an outer perimeter of the plate body.

According to another aspect, there is provided a backplate for installation around a utility penetration on an exterior surface of a building, the backplate comprising a plate body having a flange extending perpendicularly from a first surface of the plate body. The flange defines a receptacle sized and shaped to receive a utility box. The plate body has an inner portion within the flange and an outer portion outside the flange. A removable frame engages the flange. The removable frame has a flange-engaging portion and an outward extending portion. At least the outward extending portion, the flange engaging portion and the plate body define a U-shaped channel that receives siding installed on the exterior surface of the building. At least one of the flange and the removable frame have a sloped surface that slopes downward toward an outer edge of the plate body.

According to an aspect, the sloped surface may comprise a central high portion, where the sloped surface slopes downward away from the central high portion.

According to an aspect, the backplate may further comprise a second sloped surface perpendicular to the sloped surface.

According to an aspect, the inner portion of the plate body may comprise apertures through the plate body for receiving one or more utility lines and for receiving a mounting system. The apertures may be formed by removing knockouts.

According to an aspect, the inner portion of the plate body may be spaced outward from the outer portion of the plate body in the direction of the flange.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 4 is a front perspective view of a backplate installed with a utility box.

FIG. 5 is a side elevation view of a backplate installed with a utility box.

DETAILED DESCRIPTION

Figure 1:
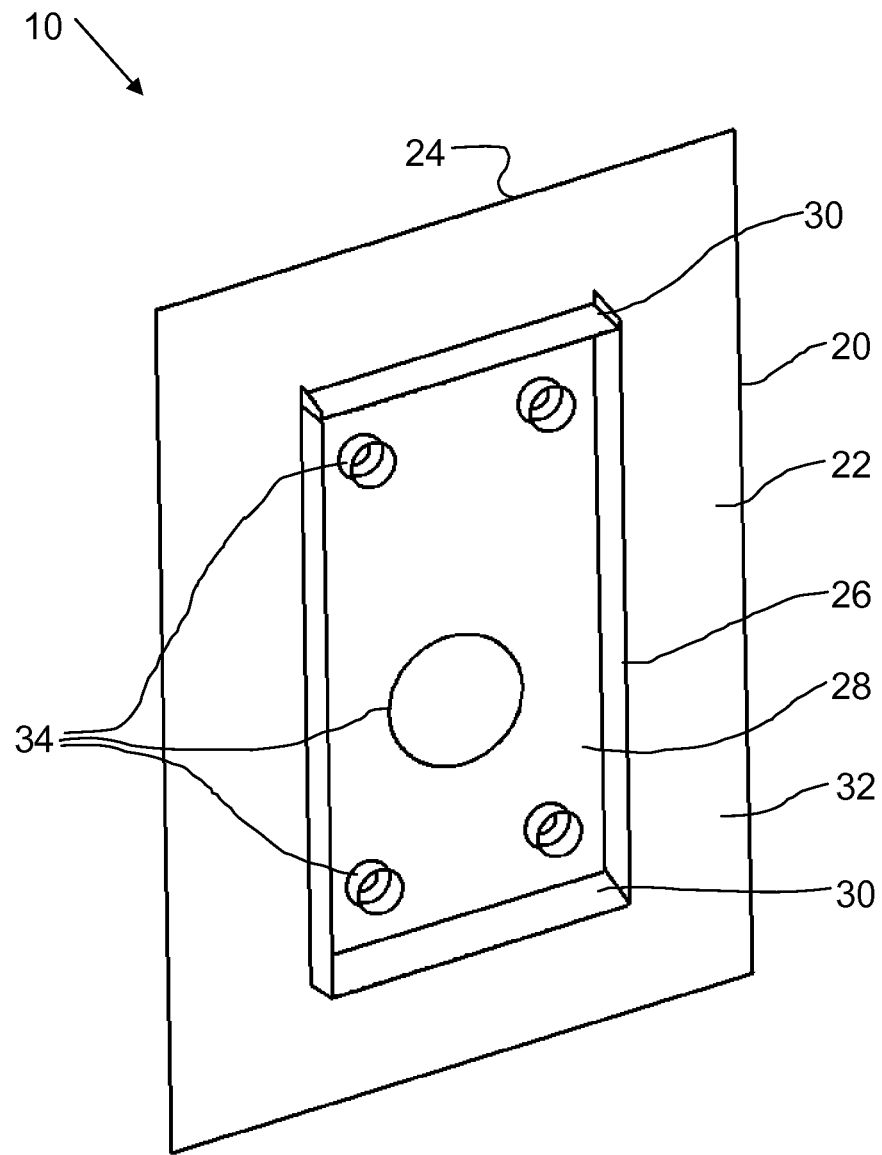
FIG. 1 is a front perspective view of a backplate for a utility box.

A backplate for a utility box, generally identified by reference numeral 10, will now be described with reference to FIGS. 1-15.

Figure 6:
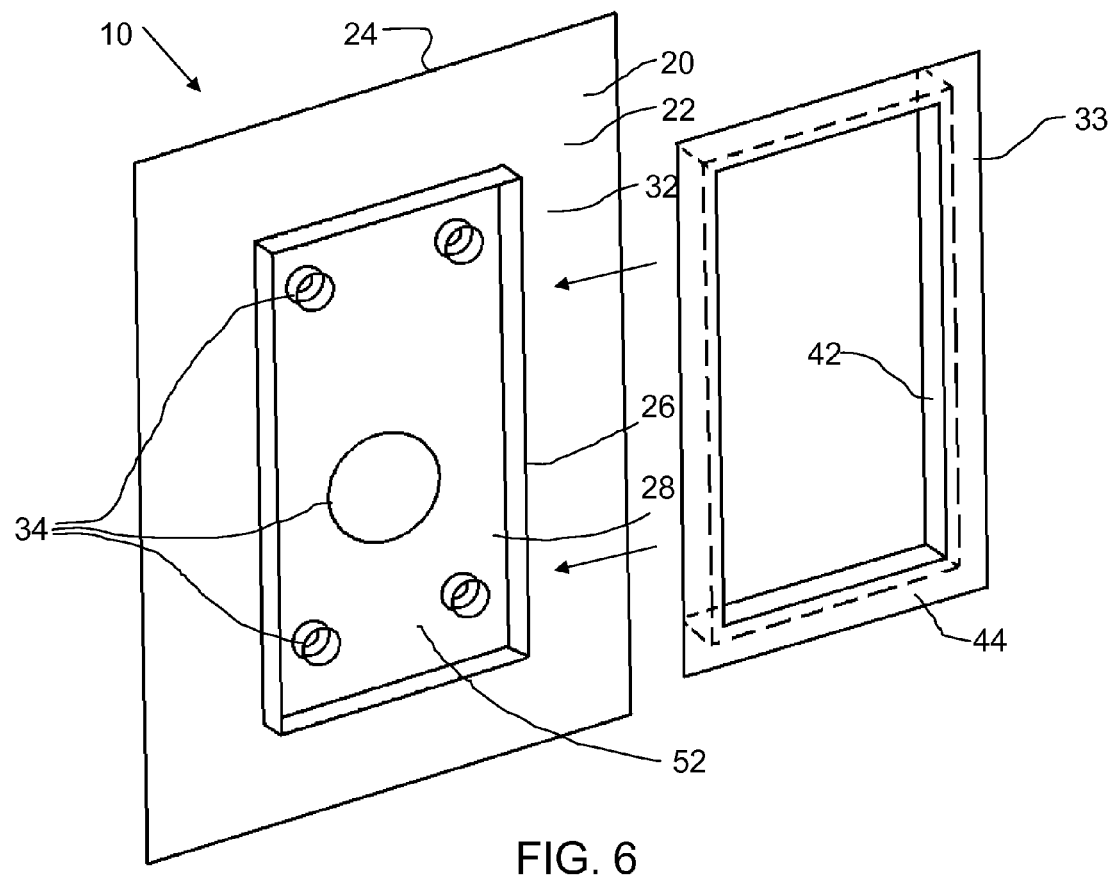
FIG. 6 is an exploded perspective view of a two-part backplate.
Figure 7:
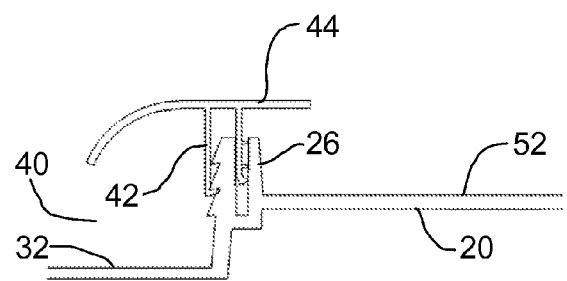
FIG. 7 is a detailed side elevation view in section of a connection of the backplate of FIG. 6.
Figure 12:
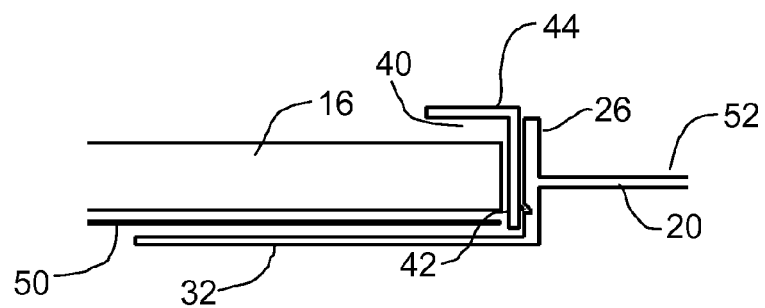
FIG. 12 is a detailed side elevation view of the two-part connection of the backplate of FIG. 6.

Referring to FIGS. 4 and 5, backplate 10 is designed to be installed between a utility box 12 and an exterior surface 14 of a building. As shown, backplate 10 is installed within the siding 16 of the building. While vinyl siding is shown, it may be any type of siding typical to building construction. Siding 16 is generally installed after utility box 12 on a new construction, although retrofits and renovations may require siding to be cut away first. Referring to FIGS. 6 and 7, backplate 10 may be made from two parts, which allows the edge of siding 16 to be covered and hidden, as shown in FIG. 12.

Figure 3:
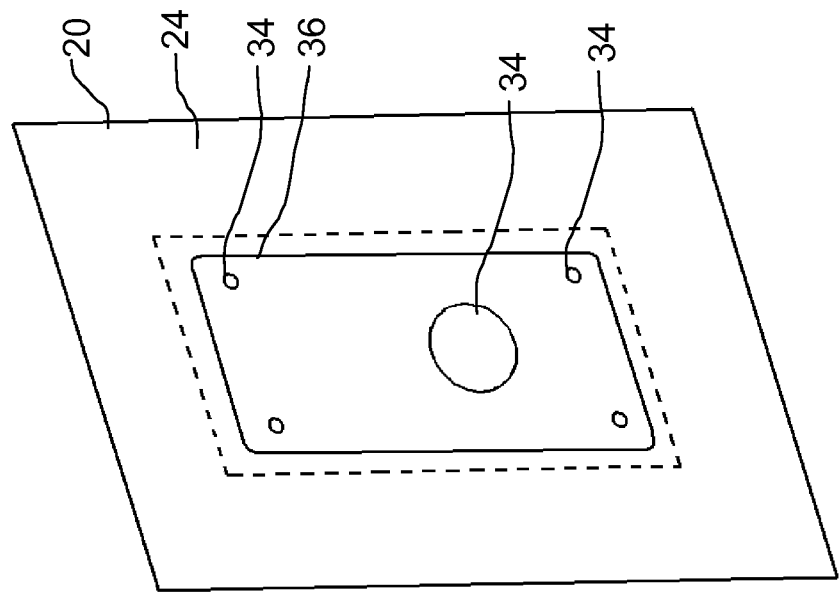
FIGS. 2 and 3 are rear perspective views of backplates.
Figure 2:
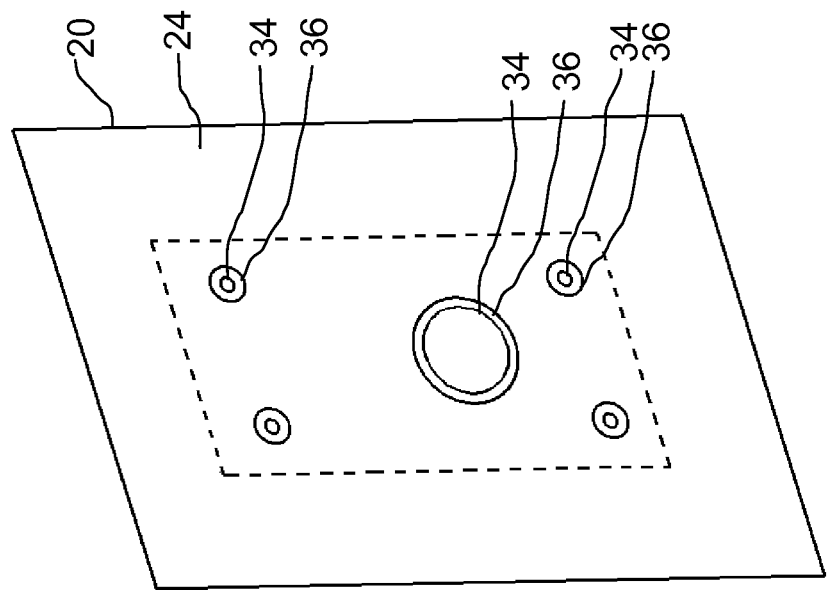

Referring to FIGS. 1-3, backplate 10 has a plate body 20 having a first side 22 and a second side 24 (shown in FIGS. 2 and 3). Preferably, plate body 20 is made from an impermeable plastic material with sufficient strength to retain its shape. Plate body 20 may be rigid or resilient, depending on the preferences of the user, but is preferably suitable to withstand extreme weather conditions that may be encountered as well as the forces applied during installation and incidental contact through its useful life.

Figure 8:
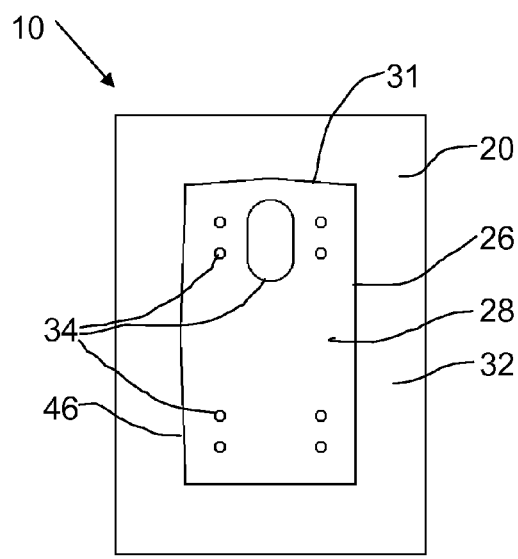
FIG. 8 is a front elevation view of the first part of the backplate of FIG. 6.
Figure 9:
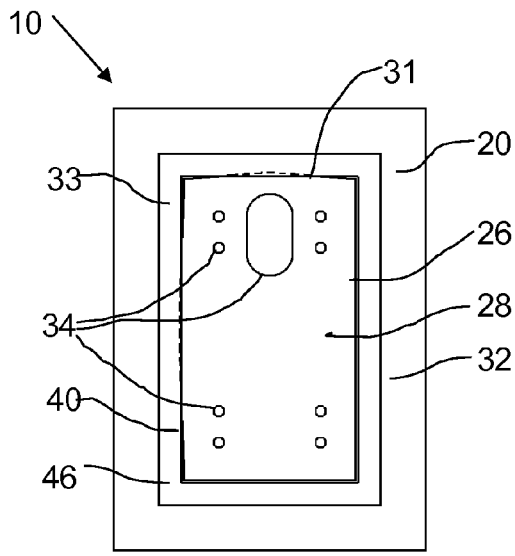
FIGS. 9 and 10 are front elevation views of the backplate of FIG. 6.
Figure 10:
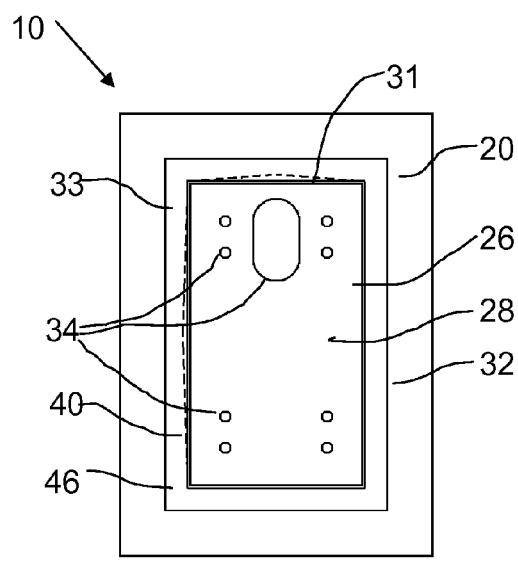
Figure 11:
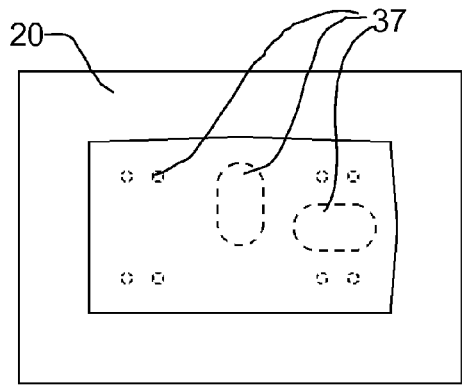
FIG. 11 is a front elevation view of a backplate with knockouts.

Referring to FIG. 1, plate body 20 carries a moisture dam 26 on first side 22. Moisture dam 26 extends outward from first side 22 of plate body in a generally perpendicular direction to define a receptacle 28 that is sized and shaped to receive the utility box as shown in FIGS. 4 and 5. Referring to FIGS. 4 and 5, when plate body 20 is installed between utility box 12 and exterior surface 14, moisture dam 26 receives and extends around an outer perimeter of a rear surface 18 of utility box 12. Moisture dam 26 is preferably designed to be close-fitting around utility box, and will follow the general shape. As shown, utility box is rectangular, such that receptacle 28 is also rectangular, but it will be understood that receptacle 28 may be varied to match the shape of utility box 12. While it is not absolutely necessary to have moisture dam 26 completely enclose the outer perimeter of utility box 12, a complete enclosure will provide the best protection against moisture. Moisture dam 26 preferably has edges on the top, bottom and sides, and has a sloped surface on at least the top of moisture dam 26. In FIG. 5, moisture dam 26 is shown as having two sloped surfaces, with downwardly sloped surfaces 30 positioned above and below utility box 12, which may be referred to as drip caps. Drip caps 30 are designed to direct any moisture to flow away from exterior surface 14 of the building. While drip caps 30 are shown as having a relatively flat slope, they may take various shapes as will be recognized by those skilled in the art. In another example, referring to FIG. 8 moisture dam 26 has a top surface 31 that is angled downward from the center of top surface 31 toward the sides of plate body 20. This will direct water to the sides of utility box 12. When coupled with a detachable frame 33 as shown in FIG. 6, this will create a U-shaped channel to carry water around utility box 12. Referring to FIG. 8, there may also be an angled side surface 46. This allows backplate 10 to be installed in either a portrait or landscape orientation, while still ensuring water is redirected to the sides.

The U-shaped channel, labelled 40, can be seen in FIGS. 7 and 12-15 and is formed from detachable frame 33, plate body 20 and moisture dam 26. U-shaped channel 40 also receives siding 16 and covers the unfinished edge of siding 16. Detachable frame 33 has a connector portion 42 that engages moisture dam 26 and a face portion 44 attached at an outer edge of connector portion 42. Detachable frame 33 may take different forms. For example, as shown in FIG. 7, face portion 44 has a curved surface, while in FIG. 12, face portion 44 has a straight surface. Referring to FIGS. 6 and 7, face portion 44 extends inward and covers moisture dam 26, while in FIG. 12, face portion 44 ends outside moisture dam 26. Alternatively, referring to FIG. 9, face portion 44 may overlap only a portion of the sloped top surface 31 and sloped side surface 46 that extends under face portion 44. As a further alternative, referring to FIG. 14, face portion 44 may form a complete surface that covers the portion of plate body 20 within moisture dam 26, or, referring to FIG. 15, may have openings 48 to receive an elongate body, such as a pipe 49 as shown. In that sense, frame 33 may be considered to be made from at least connector portion 42. Alternatively, in the example shown in FIG. 10, connector portion 42 may form the sloped surfaces of backplate 10 and play the role that moisture dam 26 plays in other examples, while what is referred to as moisture dam 26 acts primarily to engage and hold frame 33 in place. One disadvantage of this design is that it requires the bottom of connector portion 42 to seal against plate body 20, whereas moisture dam 26 may be integrally formed with plate body 20. Connector portion may connect using various forms. Two examples of connections are shown in detail in FIGS. 7 and 12 with interlocking profiles, but other designs may also be used.

As shown, plate body 20 includes a skirt portion 32 that extends outward away from moisture dam 26. Referring to FIG. 5, skirt portion 32 extends under siding 16. Preferably, referring to FIG. 13, skirt portion 32 will also cooperate with any building wrap material 50 (such as Tyvek™) to prevent moisture from flowing against exterior surface 16 of the building.

Figure 13:
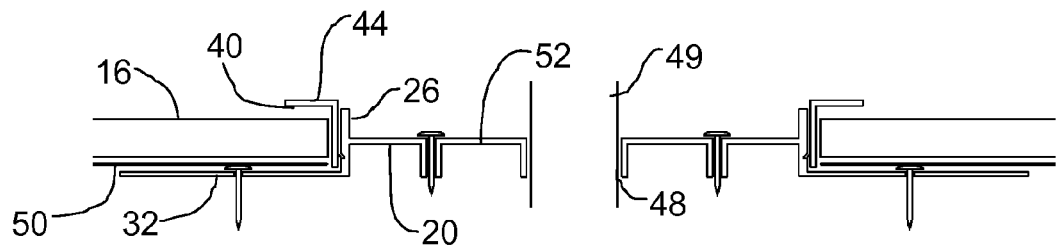
FIGS. 13, 14, and 15 are side elevation views in section of alternative installations using the backplate of FIG. 6.
Figure 14:
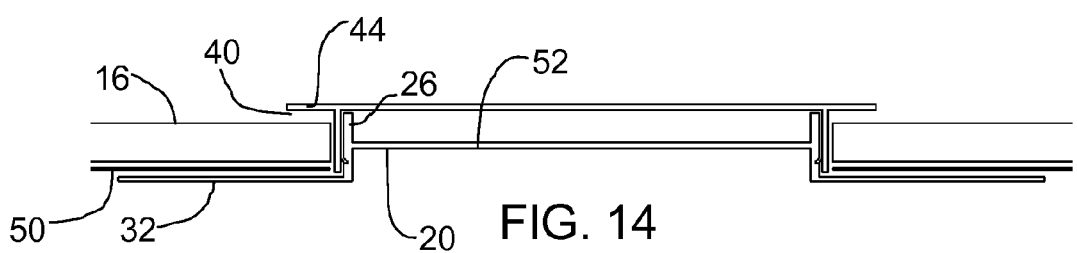
Figure 15:
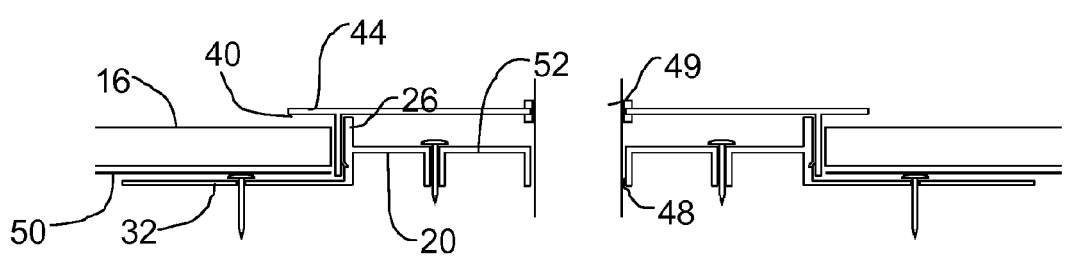

Referring to FIGS. 2 and 3, plate body 20 includes apertures 34. These apertures are used to allow plate body 20 to be mounted with utility box 12 as well as to allow utility lines to pass through utility box 12 and plate body 20 before entering the building, as shown in FIG. 5. Generally speaking, plate body 20 and utility box 12 will be mounted using screws, but plate body 20 may be adapted to the specific type of mounting system used to secure utility box 12. The utility lines used with the depicted type of utility box 12 are generally cables, such as communication lines, electrical wiring, etc. but other types of utility boxes 12 may also be used, with plate body 20 adapted accordingly. In particular, utility box 12 may be a meter, where the utility lines are sensor lines that communicate the usage of a particular utility. Apertures 34 may include a larger, oval shaped aperture that allows the utility lines (not shown) to pass through. The elongated opening allows for differences in utility boxes and where the utility lines connect to the utility box. In addition to apertures 34, second side 24 one or more seals 36 for sealing between apertures 34 and an outer perimeter of plate body. Seals 36 may be an elastomeric seal that is embedded in a groove or adhered to second side 24, or may be integrally formed with plate body 20 if made from a suitable material. Referring to FIG. 2, an example of multiple seals 36 positioned around each aperture 34 is shown, while FIG. 3 is an example of a single seal 36 positioned around all apertures 34. Other seal designs and configurations may also be used. Apertures 34 may be required to be drilled out by the user, which reduces the number of unnecessary holes to be sealed and also ensures proper placement of apertures 34. Alternatively, referring to FIG. 11, plate body 20 may be designed with knockouts 37, where apertures 34 are not formed until these scored or perforated portions are removed. Referring to FIGS. 13 and 15, plate body 20 may also be designed to receive a utility line or tubular body 49, such as a sump line, rather than a utility box. When used with a utility box 12 as shown in FIG. 4, the central portion 52 of plate body 20 within moisture dam 26 is preferably set out relative to skirt portion 32, as can be seen in FIGS. 12-15. This gives more room between the utility lines (not shown) and moisture dam 26 or frame 33.

Referring to FIGS. 4 and 5, backplate 10 is installed by positioning it between exterior building surface 14 and utility box 12. Utility box 12 is inserted into receptacle 28 such that moisture dam 26 surrounds utility box 12 and protects it against water seepage behind utility box 12. Apertures 34 in plate body 20 are aligned with the mounting apertures in utility box 12 such that plate body 20 and utility box 12 are installed at the same time using the same mounting system, such as screws 38 as shown in FIG. 5. One or more utility lines (not shown) are installed in utility box 12 and extend through one or more apertures in plate body 20 to penetrate through exterior building surface 14. As plate body 20 and utility box 12 are tightened against exterior building surface 14, seals 36 act to prevent moisture from accessing any openings in exterior building surface 14.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples above.

What is claimed is:

1. In combination:
   a utility box having an outer perimeter surrounding a rear surface; and
   a backplate for installation between the utility box and an exterior surface of a building, the backplate comprising:
   a plate body having a first side and a second side;
   apertures through the plate body for receiving one or more utility lines and for receiving a mounting system; and
   a moisture dam on the plate body and extending outward from the first side of the plate body, the moisture dam defining a receptacle that is sized and shaped to receive the rear surface of the utility box such that when the plate body is installed between the utility box and the exterior surface of the building, the plate body has an underlying portion contained within the moisture dam that underlies the utility box and an outer portion extending outward from the moisture dam, the moisture dam receiving and extending around the outer perimeter of the rear surface of the utility box, the moisture dam comprising a sloped upper surface for redirecting liquid.

2. The combination of claim 1, wherein the sloped upper surface slopes downward away from the plate body.

3. The combination of claim 1, wherein the moisture dam further comprises a sloped bottom surface that slopes downward away from the plate body.

4. The combination of claim 1, wherein the moisture dam defines a channel, and the sloped upper surface slopes continuously downward from a center point of the sloped upper surface toward an outer edge of the plate body.

5. The combination of claim 4, wherein the moisture dam comprises a second edge that is perpendicular to the sloped upper surface, the second edge comprising a sloped surface that slopes continuously from a center point of the second edge toward the sloped upper surface and a bottom surface, the bottom surface extending below the utility box.

6. The combination of claim 1, wherein the moisture dam comprises a peripheral flange carried by the plate body and a frame that is removably mounted to the peripheral flange.

7. The combination of claim 6, wherein the frame, the peripheral flange and the plate body define a U-shaped channel around the outer perimeter of the utility box when the frame is mounted to the peripheral flange.

8. The combination of claim 7, wherein the underlying portion of the plate body is spaced outward relative to the outer portion in the direction of the peripheral flange such that the utility box is spaced from the exterior surface of the building.

9. The combination of claim 7, wherein the U-shaped channel is sized to receive siding installed on the exterior surface of the building.

10. The combination of claim 1, further comprising a seal that extends around a plurality of the apertures.

11. The combination of claim 1, further comprising a plurality of seals that extend around each aperture.

12. The combination of claim 1, wherein the moisture dam extends completely around the outer perimeter of the rear surface of the utility box.

13. The combination of claim 1, further comprising one or more seals on the second side of the plate body for sealing between the apertures and an outer perimeter of the plate body.

14. In combination:
    a utility box having an outer perimeter surrounding a rear surface; and
    a backplate for installation at a utility penetration through an exterior surface of a building, the backplate comprising:
    a plate body having a flange extending perpendicularly from a first surface of the plate body, the flange defining a receptacle sized and shaped to receive the rear surface of the utility box, the plate body having an inner portion within the flange and an outer portion outside the flange;
    a removable frame that engages the flange, the removable frame having a flange-engaging portion and an outward extending portion, at least the outward extending portion, the flange engaging portion, and the plate body defining a U-shaped channel sized to receive siding installed on the exterior surface of the building, wherein, when the removable frame engages the flange, such that the removable frame extends around the outer perimeter surrounding the rear surface of the utility box; and
    at least one of the flange and the removable frame having a sloped surface that slopes downward toward an outer edge of the plate body.

15. The combination of claim 14, wherein the sloped surface comprises a central high point, the sloped surface sloping downward away from the central high point.

16. The combination of claim 14, further comprising a second sloped surface perpendicular to the sloped surface.

17. The combination of claim 14, wherein the inner portion of the plate body comprises apertures through the plate body for receiving one or more utility lines and for receiving a mounting system.

18. The combination of claim 17, wherein the apertures are formed by removing knockouts.

19. The combination of claim 14, wherein the inner portion of the plate body is spaced outward from the outer portion of the plate body in the direction of the flange.

* * * * *